United States Patent Office 3,743,649
Patented July 3, 1973

3,743,649
SYNTHESIS OF 2-(2-HYDROXYPHENYL)-BENZOTHIAZOLE
Joseph G. Wirth, Schenectady, N.Y., assignor to General Electric Company
No Drawing. Filed July 30, 1971, Ser. No. 167,833
Int. Cl. C07d 91/44
U.S. Cl. 260—304                                    5 Claims

ABSTRACT OF THE DISCLOSURE

An improved process for making 2-(2-hydroxyphenyl) benzothiazole involves the reaction of 2-aminothiophenol and phenyl salicylate. The reaction is carried out in an inert atmosphere at elevated temperature where the reactants are molten. Preferably, the phenol produced in the reaction is permitted to distill from the reaction mixture. Although not necessary, a catalyst, for example, imidazole can be used to speed up the reaction. The subject compound is an organic phosphor which fluoresces green when exposed to ultraviolet light and can be used to impart fluorescent properties to plastic compositions or it can be converted to derivatives that have improved fluorescent properties.

---

This invention relates to an improved process for making 2 - (2 - hydroxyphenyl)benzothiazole. Although this compound and its fluorescent properties are known, see for example British Pat. 884,839, a more convenient and economical process is desirable since the present high price of the material has seriously hampered its use for many applications where an organic phosphor is needed. As disclosed and claimed in my copending application, Ser. No. 167,838, filed concurrently herewith and assigned to the same assignee as the present invention, I have disclosed and claimed phthalimidomethyl derivatives of this compound which impart to it improved properties as an organic phosphor which will increase the demand for this material.

The procedure generally used now for making this compound involves first forming the sodium bisulfite adduct of salicylaldehyde which is then reacted with 2-aminothiophenol in dimethylformamide. This is a two-step procedure and in addition the 2-(2-hydroxyphenyl) benzothiazole must be separated and purified from the reaction mixture. Another process involves the reaction of salicylic acid with 2-aminothiophenol in polyphosphoric acid. This is a rather cumbersome process since the separation of the desired product from the phosphoric acid is difficult and time consuming. Generally, purification of the product requires a sublimation step. I have now discovered that phenyl salicylate, which is commercially available as salol at a reasonable price in large quantities, will react directly with 2-aminothiophenol to give high yields of very pure 2-(2-hydroxyphenyl)benzothiazole.

The reaction is readily carried out in the absence of solvent by heating the reactants in an inert atmosphere to a temperature where they form a homogeneous melt, but below the temperature where carbonization or thermal decomposition of the reactants or products occur. A convenient temperature to use is in the range of 170° to 250° C. The progress of the reaction is readily followed by periodic sampling and analysis by gas liquid chromatography. The heating is continued for a time necessary to obtain the desired amount of reaction. Generally, it is desired to obtain the highest yield. In order to prevent oxidation of the reactants and consequent loss in yield, an inert atmosphere should be used, for example, nitrogen, argon, xenon, below, at or above ambient pressure. Nitrogen is generally preferred since it is readily available and cheap.

Phenol is a by-product of the reaction but it is not essential that it be distilled from the reaction mixture as it is formed. In view of this, the reaction can be carried out in a closed reaction vessel, for example, an autoclave using a static inert atmosphere. When an autoclave is used, the inert atmosphere can be attained by use of a vacuum, if desired, but generally it offers no advantage over using the ambient pressure which can be either atmospheric pressure or that autogeneously generated in the closed system at the temperature used.

Isolation of the desired product is aided by permitting the phenol by-product to distill from the reaction mixture. It can be removed during or at the end of the reaction period. After cooling the reaction mixture to room temperature, the entire mass solidifies. To aid in breaking up the mass, a non-solvent for the desired product but a solvent for the phenol and catalyst, if used, can be added during the cooling period. Methanol is an ideal non-solvent to use. If the phenol has not been permitted to distill from the reaction mixture, treatment with methanol will remove the phenol, the catalyst, if used, and removes a yellow-colored by-product which is present in only trace amounts. The amount of methanol required is greater if the phenol has not been allowed to distill. Since it is conveniently distilled from the reaction mixture, it is preferred to permit the phenol to be distilled from the reaction mixture. Any small traces of phenol still left in the product will be removed by the methanol wash leaving a product which needs no further purification to be used either as an organic phosphor itself or to be used in preparing the phthalimidomethyl derivatives described in my copending application mentioned above.

As mentioned above, the reaction proceeds readily without a catalyst but is hastened by the use of a catalyst. For example, carrying out the reaction in the temperature range of 190–200° C. will give approximately an 80% yield in 4½ hours without a catalyst whereas when imidazole is used as a catalyst in the amount of 2% by weight of the phenyl salicylate, the yield is increased to 95% with a decrease in the reaction time to 2 hours.

The only requirements that the catalyst must meet are that it must be basic, soluble in the reaction mixture, stable under the temperature reaction conditions and not be consumed by either the reactants or the product. Most high-boiling tertiary amines and some of the high-boiling secondary amines meet these requirements. However, most such amines are relatively expensive except for imidazole which is readily available at low cost. For this reason, it is the preferred catalyst to use when one is desired.

In order that those skilled in the art may readily understand my invention, the following examples are given by way of illustration and not by way of limitation. In all of the examples, parts are by weight and temperatures are in degrees centigrade unless otherwise stated. All reactions were carried out in the presence of a nitrogen atmosphere.

EXAMPLE 1

A mixture of 10.7 g. (0.05 mole) phenyl salicylate and 6.3 g. (0.05 mole) 2-aminothiophenol was heated at 190–200° with stirring. Disappearance of the reactants and formation of 2-(2-hydroxyphenyl)benzothiazole was monitored by gas-liquid chromatography. After 4.5 hr. the reaction was complete and the melt was allowed to cool and resolidify. The solid was broken up into a fine powder, washed with methanol to remove phenol and traces of yellow color and then dried overnight at 50° C./20 mm. Yield 9.05 g. (80%). The product was sufficiently pure to use without purification.

EXAMPLE 2

A mixture of 10.7 g. (0.05 mole) phenyl salicylate, 6.3 g. (0.05 mole) 2-aminothiophenol and 0.2 g. (0.003 mole) imidazole was heated at 190–200° with stirring. After 2 hr. reaction was complete and the melt was allowed to cool and resolidify. The solid product was broken up into a fine powder, washed several times with methanol to remove phenol and dried overnight at 50° C./20 mm. Yield 10.87 g. (96%).

EXAMPLE 3

To a mixture of 6.3 g. (0.05 mole) 2-aminothiophenol and 10.7 g. (0.05 mole) phenyl salicylate was added 0.2 g. (0.003 mole) imidazole. After heating with stirring for 2 hr. at 200°, phenol was distilled out of the reaction flask under reduced pressure. When nearly all the phenol was removed the melt was allowed to cool and resolidify. The solid product was washed with methanol to remove traces of phenol and then dried overnight in an oven at 50° C./20 mm. Yield 10.90 g. (96%).

EXAMPLE 4

After warming the reactor sufficiently to melt 125 g. (1 mole) of 2-aminothiophenol (M.P. 26°), 214 g. (1 mole) phenyl salicylate and 0.68 g. (0.01 mole) of imidazole were added with stirring. After flushing the reactor with nitrogen, the flow was throttled to maintain a slow stream through the reactor. The exiting gas stream was bubbled through an aqueous sodium hydroxide solution. The reactor was heated to 170° for 3 hours during which time the phenol distilled and was swept from the reactor by the nitrogen. The phenol can be recovered by condensing or scrubbing it from the exiting gas stream. After cooling the stirred reaction mixture to 100°, 200 g. of methanol are slowly added while continuing to cool to room temperature. After centrifuging the slurry and washing with methanol, the 2-(2-hydroxyphenyl)benzothiazole was dried under vacuum at 65°. The average yield of several runs is 216 g.

The products of the above examples were identified by comparison with a known sample prepared by prior art process.

When an attempt was made to prepare 2-(2-hydroxyphenyl)benzimidazole using 1,2-diaminobenzene in place of 2-aminothiophenol, only a 50% yield of the desired 2-(2-hydroxyphenyl)benzimidazole was obtained and the product contained a number of unidentified impurities which were not removed by recrystallization. When the reaction was carried out with 2-aminophenol in place of the 2-aminothiophenol only trace amounts of 2-(2-hydroxyphenyl)benzoxazole were obtained. These results were indeed surprising since the prior art syntheses are applicable to the production of all three isologs.

As mentioned above, these products have fluorescent properties of their own and can be used to impart this property to compositions containing them. For example, lacquers may be made by dissolving the compound together with a film-forming polymer in a suitable solvent and the lacquer so produced used to coat the outside of an ultraviolet producing lamp which, when energized, would produce the fluorescent green color of the compound which has been incorporated in the coating on the envelope of the light. The compound may also be converted to the phthalimidomethyl derivatives of my copending application mentioned above and these compounds likewise may be used as stable organic phosphors in the same way as described above.

The above examples and teachings have illustrated several of the variations and modifications of the invention. These and other modifications and variations of the present invention are possible in light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. The process of making 2-(2-hydroxyphenyl)benzothiazole which comprises reacting 2-aminothiophenol with phenyl salicylate at a temperature sufficiently high to melt the reactants and to produce phenol, but below the carbonization temperature of the reactants and products, in an atmosphere inert to the reactants and products, continuing the heating until the desired amount of phenol has been formed and thereafter isolating the 2-(2-hydroxyphenyl)benzothiazole from the reaction mixture.

2. The process of claim 1, wherein the phenol is allowed to distill from the reaction mixture.

3. The process of claim 1, wherein imidazole is used as a catalyst.

4. The process of claim 2, wherein imidazole is used as a catalyst.

5. The process of claim 1, wherein imidazole is used as a catalyst, the heating is continued until the desired amount of phenol has formed in the reaction mixture without removal therefrom and thereafter the phenol is distilled from the reaction mixture prior to isolation of the product.

References Cited
UNITED STATES PATENTS

| | | | |
|---|---|---|---|
| 2,985,661 | 5/1961 | Hein et al. | 260—304 |
| 3,647,812 | 3/1972 | Smith | 260—304 |

OTHER REFERENCES

Elderfield, Heterocyclic Compounds, vol. 5, John Wiley & Sons, New York, p. 507 (1957).

RICHARD J. GALLAGHER, Primary Examiner

U.S. Cl. X.R.

252—301.2; 313—108